Dec. 16, 1941.      B. D. EMANUEL      2,266,686
BATTERY CONSTRUCTION
Filed March 20, 1939
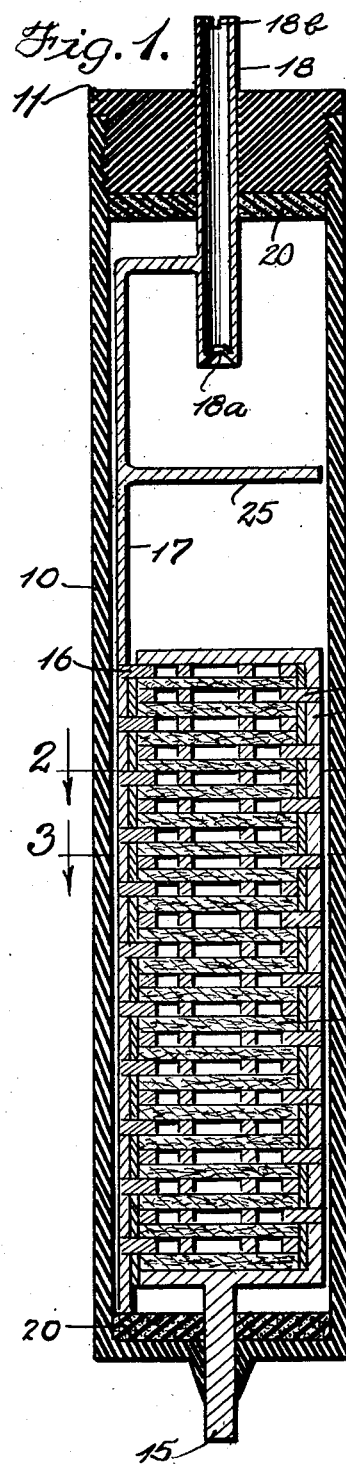
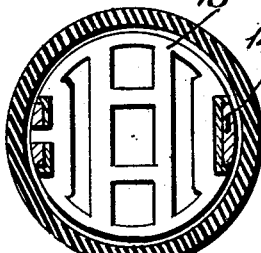
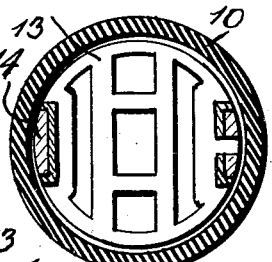
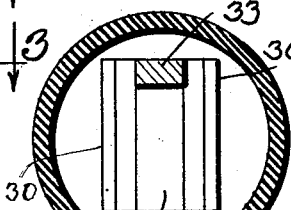
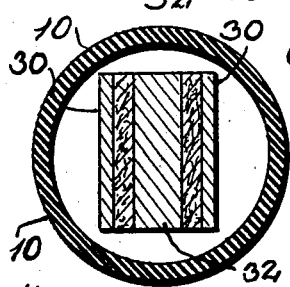
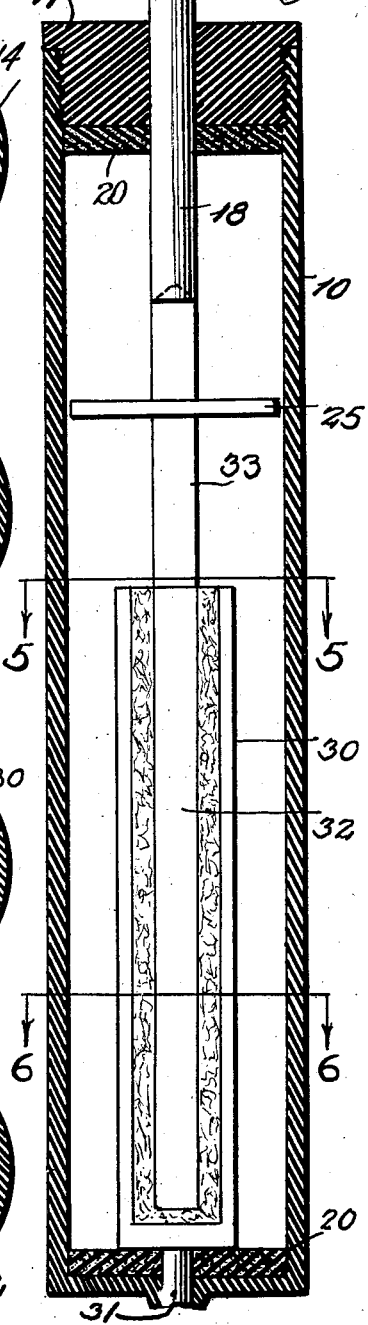

Patented Dec. 16, 1941

2,266,686

UNITED STATES PATENT OFFICE 2,266,686

BATTERY CONSTRUCTION

Benjamin D. Emanuel, Anderson, Ind., assignor to Fern V. Emanuel, Anderson, Ind.

Application March 20, 1939, Serial No. 263,004

2 Claims. (Cl. 136—6)

This invention relates to battery construction, and pertains more particularly to battery structures designed for flashlight service and particularly to service of this type where the battery is of the re-chargeable type, such, for instance, as is disclosed in my companion application filed April 25, 1938, Serial No. 204,239.

In the arrangement of said application the battery is of a type which permits extended service before re-charging, and the charging operation is designed to be provided without removing the battery from the casing of the flashlight, the complete assembly including a support for the flashlight when not in service, the positioning of the flashlight on the support providing the start of the re-charging activities which continue while the light is so positioned, the rate of charging being very low.

The battery disclosed in said application is designed more particularly for use in connection with the electrolyte in liquid form, the battery being designed to be replaced by the manufacturer at the end of a stated period—a year for instance—the user returning the one in use and paying a substitution charge; the battery itself is of a type which can be re-conditioned, and the latter provides for replacement service.

It has been found, however, that the battery assemblage is such as to be particularly advantageous for use in connection with an electrolyte of the "gel" type, such, for instance, as presented in the application of Bartlett, filed August 18, 1938, Serial No. 225,647. The electrolyte of the latter is formed from sulphuric acid and sodium silicate, with a water content, the proportions, etc., being critical with a view to providing a temporary delay in the gel action with a view to ensuring proper penetration of the electrolyte into the electrode formation while the electrolyte remains in its liquid form. For instance, in practice, the beginning of the gel action is delayed for a period of about fifteen minutes, during which time the solution remains in liquid form. Since the separators of the electrode assembly are of a type which will absorb liquids, it can be understood that with a delay such as this, the liquid electrolyte can properly permeate the assembly before gel action takes place, the result being that the electrolyte becomes sufficiently stable through the gel condition to maintain its position within the electrode assembly regardless of the flashlight position in service, a condition which permits of the partial elimination of certain portions of the structure of the battery of my earlier application above identified, thus not only simplifying the structure, but making the assembly highly serviceable for the purpose. For instance, comparative tests have shown that a flashlight equipped with the gel electrolyte under the present invention, will provide a continuous service of practically four times the length of time which a dry cell battery of similar rated value will provide, the tests being made on the basis of break-down action in both cases.

However, it has been found that although the two electrolytes—the liquid and the gel form— are introduced into the battery in the same manner and to generally similar amounts, the gel form will develop certain conditions which can affect the battery action, if provision is not made to overcome the conditions. For example, the electrolyte ingredients set up the gel condition after a time interval, but it is generally found that there is a certain portion which remains liquid—probably a slight excess of the water content which is not absorbed in the gel itself; this excess passes to the ends of the gel zone, and, being free, may leak out of the battery and affect the flashlight structure itself. For this reason it has been found desirable to provide, within the battery itself, a means which will independently absorb this excess, which may vary slightly as to volume; this result is obtained by providing the end zones of the interior of the battery with an absorbing means, such, for instance, as a washer-like formation of sponge rubber, the interstices of which take up the liquid and retain it, since there is no material pressure placed on the absorbing element. Hence, the excess liquid or moisture content will be retained within the battery itself, the washer-like formation being sufficient to absorb the moisture or liquid content that may be present. Should the gel content, in service, require further moisture, the content thus absorbed by the washer-like member or members will be available, so that such absorbing means serves somewhat as a storage means for such excess liquid or moisture.

Another condition is brought about by the fact that the amount of liquid electrolyte introduced is in excess of that which is actually required to cover the electrodes, with the result that there will be a portion of the gel content above the top of the electrodes. Since that portion of the gel content actually outside of the electrode zone would be unsupported, it is possible for it to break away and thus set up possible conditions of deterioration of the battery itself. To meet the conditions, a retaining member is added, and this serves as a barrier to prevent movement of the gel out of its position, with the result that the gel content remains in its initial desired position regardless of the conditions of service the flashlight may encounter; in addition, the member serves as an indicator.

To these and other ends, therefore, the nature of which will be disclosed as the invention is hereinafter described in detail, said invention consists in the improved construction and combination of parts hereinafter more fully described in detail, illustrated in the accompanying drawing, and more particularly pointed out in the appended claims.

In the accompanying drawing, in which similar reference characters indicate similar parts in each of the views—

Figure 1 is a longitudinal sectional view of one form of battery which includes the present invention;

Figures 2 and 3 are cross-sectional views of the battery of Figure 1, taken respectively on lines 2—2 and 3—3 of Figure 1;

Figure 4 is a longitudinal section of another form of battery employing the present invention;

Figures 5 and 6 are cross-sectional views taken, respectively, on lines 5—5 and 6—6 of Figure 4.

The underlying structural features of both forms of the battery shown, include the presence of a casing 10 having an open end to which is removably secured a closure 11, both formed of suitable material such as hard rubber or a phenolic composition, the closed end of the casing having an opening for the passage of one of the terminals, while the closure has an opening for the passage of the other terminal, the latter terminal preferably being a combined terminal and vent. The electrode formation is in the form of plate elements electrically separated from each other by separators, one of the plate elements being connected to the combined vent and terminal, with the other element leading to the closed end terminal. The details of the electrode structures are those utilized in the disclosure of my companion application, and will therefore be described but briefly herein.

The assembly of Figures 1 to 3, is based upon the use of a plurality of disk plates arranged in spaced parallelism and axially alined with separators 12 between adjacent disks. Alternate disks are secured to a carrier, with the remaining disks carried by a second carrier. For instance, plates 13 are secured to carrier 14, with the latter connected to the negative terminal 15; plates 16— structurally similar to plates 13—are secured to carrier 17 which leads to and is secured to the combined terminal and vent 18 which serves as the positive terminal. The plates 13 and 16 are of grid type, as indicated in Figures 2 and 3, and are similar in conformation with each having an anchoring lug which can be welded, for instance, to the carrier with which it is associated. As a result, the plate assemblies are generally similar within the plate zone, with the assemblies properly spaced and insulated.

In practice, the space available for the plate assembly is approximately 1 inch in diameter and approximately 3½ inches in length, as a result of which a comparatively large number of plates may be utilized, as indicated. The separators 12 may be of suitable material, such as wood, specially-treated asbestos sheet material, spun glass, bagasse felt, and the like. With the liquid electrolyte the material used must be capable of retaining the liquid and prevent complete drainage when the flashlight is inverted in service, but with the gel form the character of the separator material is less restricted, since the gel condition of the liquid tends to prevent its flow, so that the selection of the material used is based more particularly upon the ability of the separator to rapidly absorb the liquid before the gel action takes place.

As indicated above, the components of the electrolyte are of a nature such as will rapidly gel. However, by extensive experimentation, it has been found that with definite values of the ingredients, it is possible to delay the gel action for say fifteen minutes during which the electrolyte remains liquid and can therefore be absorbed by the plate assembly structure, so that proper permeation of the separator and plates can take place before the gel action actually sets in. There is a slight excess of water content, and to tend to isolate this and prevent its having a deleterious effect on the battery, suitable storage conditions are provided. For instance, one or more washer-like elements 20, formed of sponge rubber are located at one or both end zones of the casing, these elements having sufficient body to retain their dimensions, and at the same time permit the water content to be retained within the interstices. In the drawing, one of these washers is shown as located at each end zone of the casing, but it will be understood that this is illustrative and that the element or elements may be positioned at but one end zone or be located at both ends as may be desired and found most suitable.

Since the electrolyte itself develops into the gel formation, the combined terminal and vent structure of the companion application has been simplified since there is no necessity for trapping mobile liquid. Hence, in the present disclosure, this member, indicated at 18, is in the form of a tube having its inner end arranged to provide a small opening 18a which permits the escape of any gases which may develop during the charging operation. As is the case with the companion application, and as indicated in Figure 1, the member 18 is secured to the carrier 17, and passes out through the closure 11, the outer end of the member being kerfed as at 18b to permit escape of the gases while the end of the member is in contact with the terminal of the lighting assembly with which member 18 co-operates.

In preparing the battery, it is essential that the amount of electrolyte be such as to completely enclose or envelop the plate assembly. As a result that portion of the gel which may be above the upper plane of the plate assembly is not completely bound to the assembly, a condition which would permit the excess to move away from the assembly during service conditions—a result which may be detrimental. Hence, means is provided to anchor such gel content, this being in the form of a plate 25, secured to carrier 17 and having a sufficient diameter to retain the gel from movement without, however, preventing the electrolyte in liquid form from passing into the plate zone. The position of the plate is such as to provide the desired excess of the gel, and, in practice, the electrolyte is poured into the casing until its level reaches plate 25, so that the gel content thus lies below and in contact with the plate and is held from shifting; the volume of liquid introduced may carry the level to the top plate of the plate without creating damage, since the annular amount is so small as to not be liable to separate from the body of the mass. In other words, the plate assembly zone is enveloped by the gel electrolyte and the plate 25 forms a means for preventing a break-down of the enveloping condition. Obviously plate 25 will serve as an indicator to determine when the desired volume of liquid electrolyte has been poured into the casing.

The form of battery shown in Figures 4 to 6 differs from that thus described only in the plate assembly zone. Here, the negative electrode 30 is U-shape, with the negative terminal 31 projecting through the end of the casing similar to terminal 15. The positive electrode 32 is located centrally between the legs of electrode 30, with a separator formation between them as indicated in Figure 6. Electrode 32 is connected to the carrier 33 which corresponds to carrier 17 of Figure 1, this carrier supporting the plate 25 and the combined terminal and vent formation 18 as in Figure 1. The electrolyte characteristics are similar to those of Figure 1. While this form is adapted to employ the gel form of electrolyte (the reason for its inclusion herein) it is more desirable for use in connection with the liquid form of electrolyte, the assembly of Figure 1, being preferred for use in connection with the gel form of electrolyte.

As indicated above, a battery of these types, with the form of Figure 1 preferred, operates with great efficiency with the gel form of electrolyte, comparative break-down tests of this battery and dry-cell batteries of equal rating, showing a service superiority of the present type of substantially four times value of that of the dry-cell type, before the battery value is impaired. Since, however, the present battery can be recharged to restore the value, the advantage over the dry-cell type is still greater.

In forming the electrolyte, the materials, quantities, temperatures, etc., of the ingredients are practically critical, in order that assurance may be had that the plate zone will be thoroughly permeated before the gel action interferes with such action, and while an electrolyte of this type is not as efficient as the liquid type for storage battery service generally, the gel type is advantageous in a battery of this type and for this particular service, due to the fact that the service permits the use of an electrolyte in which the current draws slowly, in contrast with general storage battery action where a quick response is essential. And the conditions are such as to lend itself readily to the general method of marketing by which the user returns the used battery after a lengthy term of service, and on payment of a service charge receives a fresh battery, the manufacturers then reconditioning the spent battery; such course ensures that the battery will be properly equipped for service, since the renewed electrolyte will be provided by the manufacturer equipped for the service.

While I have herein shown and described several ways for practicing the present invention, it will be readily understood that changes or modifications therein may be found desirable or necessary in meeting the various exigencies in use, or the wishes of the user, and I therefore desire it to be understood that I reserve the right to make any and all such changes or modifications as may be found desirable or essential insofar as the same may fall within the spirit and scope of the present invention as expressed in the following claims.

What is claimed as new is:

1. In battery construction for flashlight service, wherein the electrolyte in service is of gel characteristic and is introduced in liquid form and rapidly reaches its gel consistency, wherein the battery is rechargeable, and wherein the charging is provided while the battery is contained within the flashlight casing, and in combination, a casing, an electrode system for the battery mounted within the casing, said system including plate structures and their carrying elements and having its electrolyte-content zone of less length than the internal length of the casing, said system having individual battery terminals for the respective poles of the system with the terminals supported by the plate-carrying elements of the system, said terminals being exposed respectively at different ends of the battery with one of said terminals being tubular to additionally serve as a gas vent during battery charging, said system also including means carried permanently and solely by one of the supporting plate-carrying elements and spaced from the electrolyte-content zone a distance sufficient to provide a substantial volume of the gel content intermediate the means and an end of such zone, said means being dimensioned to permit sufficient rapidity of flow of the liquid electrolyte as to permit passage of the liquid into the electrolyte-content zone prior to beginning of gel development to thereby assure proper completion of the content of such zone, the position and the dimensions of the means being such it will serve as an indicator for determining the end of the liquid-introducing activity and to maintain the continuity of the gel content during service by preventing bodily movement of such content during flashlight usage, said means being in the form of a plate extending transversely of the casing and having a diameter less than the internal diameter of the casing, said plate being integral with the carrying-element for the vent terminal, whereby the latter is positioned above the content zone during liquid introduction.

2. In battery construction for flashlight service, wherein the electrolyte in service is of gel characteristic and is introduced in liquid form and rapidly reaches its gel consistency, wherein the battery is rechargeable, and wherein the charging is provided while the battery is contained within the flashlight casing, and in combination, a casing, an electrode system for the battery mounted within the casing, said system including plate structures and their carrying-elements, and having its electrolyte-contact zone of less length than the internal length of the casing, said system having individual battery terminals for the respective poles of the system with the terminals supported by the plate-carrying-elements of the system, said terminals being exposed respectively at different ends of the battery with one of said terminals being tubular to additionally serve as a gas vent during battery charging, said system also including means carried permanently and solely by one of the supporting plate-carrying elements and spaced from the electrolyte-contact zone a distance sufficient to provide a substantial volume of the gel content intermediate the means and an end of said zone, said means being dimensioned to permit sufficient rapidity of flow of the liquid electrolyte as to permit passage of the liquid into the electrolyte-contact zone prior to beginning of gel development to thereby assure proper completion of the content of such zone, the position and the dimensions of the means being such that it will serve as an indicator for determining the end of the liquid-introducing activity and to maintain the continuity of the gel content during service by preventing bodily movement of such content during flashlight usage, said electrode system including a plurality of transversely-extending plates separated by separators, said plates being carried by the respective plate-carrying elements with alternate plates carried by the same element and adjacent plates carried by different elements, said carrying-elements being located in the peripheral zone of the plates and each being of extended width and relatively narrow thickness on cross-sections of the elements within the plate zone.

BENJAMIN D. EMANUEL.